Jan. 9, 1951        C. W. WATSON        2,537,496
SYNTHESIS OF HYDROCARBONS
Filed March 26, 1947
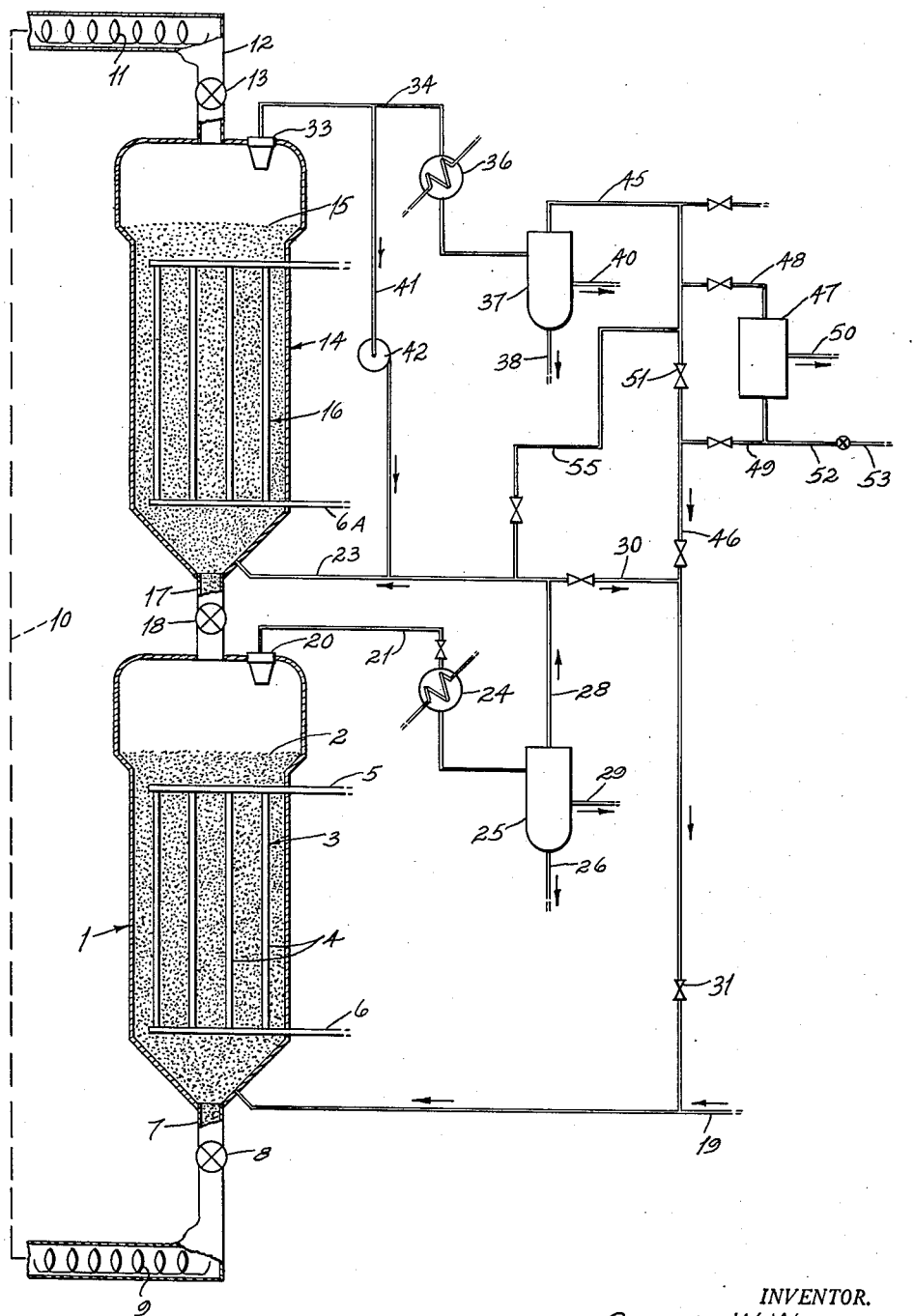
INVENTOR.
CLAUDE W. WATSON
BY
ATTORNEY Patented Jan. 9, 1951

2,537,496

UNITED STATES PATENT OFFICE 2,537,496

SYNTHESIS OF HYDROCARBONS

Claude W. Watson, Scarsdale, N. Y., assignor to The Texas Company, New York, N. Y., a corporation of Delaware Application March 26, 1947, Serial No. 737,326

7 Claims. (Cl. 260—676)

The present invention relates to the synthesis of hydrocarbons from carbon oxide and hydrogen.

In accordance with the conventional process for the catalytic reduction of carbon oxide with hydrogen, reactant feed gases are usually caused to react in a state of, or quite similar to, adsorption on the surface of the catalyst followed by desorption of the reaction products. Characteristic conditions of elevated temperature, necessarily held within close limits, are desirable in order, among other things, to assure, for example, the predominant production of hydrocarbons within the particular boiling range required. However, those conditions, while requisite to one or more of the requirements, such as, desorption of the desired hydrocarbons, may not be optimum with respect to other aspects of the process. Moreover, the process has been characterized by objectionable formation of elemental carbon with a tendency toward disintegration of the catalyst, by the incidence of difficultly controllable side reactions resulting in undes'rable variation from good theoretical yield of product, and by the excessive production of other undesired by-products such as carbon dioxide and methane.

Many of the foregoing objections are particularly disadvantageous in connection with the use of iron catalysts which, for economic and other reasons, are otherwise to be preferred.

It is an important object of the present invention to provide an improved process for the synthesis of hydrocarbons from carbon oxide and hydrogen with by-product production limited essentially to by-product water vapor, particularly in the presence of an iron catalyst.

Another important object of the present invention contemplates the synthesis of hydrocarbons under conditions which substantially eliminate the excessive production of carbon on other solid phases with accompanying mechanical degeneration, or fouling of the catalyst. Other and further objects of the present invention will be apparent from a consideration of the following disclosure.

The invention more particularly contemplates the controlled operation of the present synthesis in separate stages under different respective temperature conditions such that, in the first stage, the catalyst is carbided by the action of a synthesis gas with the consumption of hydrogen and carbon monoxide and the liberation of by-product water vapor but without the formation of any substantial or major portion of hydrocarbons. In a second stage, the carbided catalyst, at a higher temperature and under reaction conditions appropriate for the formation of the desired hydrocarbons, is treated with what is essentially hydrogen, advantageously residual gas from the first stage, in order to decarbide or reduce the catalyst surfaces with the liberation of hydrocarbons of any desired, predetermined molecular size.

As a result of my researches in the present field, I have come to the conclusion that catalyst depletion as evidenced by excessive elemental carbon formation and catalyst particle disintegration is due essentially to the decomposition of carbon monoxide in accordance with the following:

$$2CO = CO_2 + C$$ 

While a number of other conditions might and probably do account for some of the carbon formation, it is believed that the foregoing decomposition is the most significant factor. It occurs readily at even high ratios of carbon dioxide to carbon monoxide and thus cannot be suppressed by commercially feasible amounts of $CO_2$ recycle in the usual direct synthesis processes.

In accordance with the present invention, however, it has been discovered that the first or carbiding stage of the reaction may be readily and efficiently operated under reaction conditions such that decomposition of carbon monoxide to carbon dioxide and elemental carbon is not a material factor and such that the carbon monoxide is readily and substantially completely consumed in the formation of a carbide of the catalyst.

In the second stage of the reaction, however, where hydrocarbon formation occurs, the carbon monoxide is not a necessary nor desirable reactant, and therefore may be completely absent or maintained at such low value that its presence is of no detrimental significance. Moreover, with complete consumption of carbon monoxide in the first stage, the effluent gas therefrom is accordingly substantially free from carbon monoxide and thus suitable for use in the second stage.

Accordingly the present process avoids the effect of those side reactions which usually impair the conventional catalytic process for direct formation of hydrocarbons by consuming carbon monoxide and otherwise making is economically impractical to carry the synthesis reaction to reasonable completion. Moreover, under the conditions of temperature and pressure prevailing in the first stage, hydrocarbon formation is minimized or eliminated so that, predominantly, carbiding of the catalyst proceeds with the consumption of carbon monoxide and hydrogen in the synthesis gas.

The type of reaction going forward in the first, or carbiding zone, is essentially as follows:

$$2Fe_3C + CO + H_2 = 3Fe_2C + H_2O$$

It is of particular importance to point out that the foregoing reaction is typical rather than actual, in that the initial condition of the catalyst, represented above by $Fe_3C$, includes a wide variation in carbon content. That is to say, the catalyst supplied to the first step may vary all the way from slightly carbided elemental iron to various increased degrees of combined carbon content, and therefore the increase in the degree of carbiding is purely illustrative. Otherwise, however, the reaction appears to proceed the same, irrespective of the condition of the catalyst, with the consumption of equal molecular proportions of carbon monoxide and hydrogen and the production of a single mol of water vapor and a mol of carbide for each mol of carbon monoxide consumed.

It is advantageous in carrying out the invention to assure a flow of decarbided catalyst relative to the stream of feed gases adequate in quantity to substantially completely consume the carbon monoxide available in the feed gases. In other words, depending upon the initial condition of the catalyst, the proportion of feed gas is preferably no more than that amount sufficient to carbide the iron, so that the carbon monoxide will be substantially completely consumed. In view of the varying condition of the numerous catalysts which may be employed and the corresponding variation in degree of chemical carbon absorptivity, it is impossible to specify particular ranges of proportioning which will cover all cases. On the other hand, this condition may be readily determined in actual operation, as will hereinafter appear more in detail.

In the second or decarbiding zone, the carbided catalyst is subjected to contact, at a higher temperature, in the range typical of the conventionally operating hydrocarbon synthesis step, with hydrogen preferably, the residual, substantially carbon monoxide free effluent gas from the first zone, under conditions such that hydrocarbon formation proceeds rapidly and without undesirable side reactions. In general, the reaction is characterized by reduction of iron carbide with the formation of hydrocarbon groups of varying molecular length, under usual temperature conditions and pressure conventional in hydrocarbon synthesis, and without substantial net production of methane or carbon dioxide, the catalyst being meanwhile returned to a condition suitable for use in the initial or carbiding step in a relatively decarbided condition.

From the foregoing, it will be apparent that the present invention is particularly adaptable to use in connection with a circulating catalyst system, wherein the catalyst successively passes through carbiding and decarbiding zones, advantageously in countercurrent relationship to the gases. Each of said zones is preferably so operated as to place the catalyst in suitable condition for supply to the succeeding zone.

Operating in this manner, moreover, it is particularly advantageous to supply the first zone with a typical synthesis gas, comprising carbon monoxide and hydrogen, with the hydrogen in substantial molar excess over the carbon monoxide, the effluent gas, substantially free from carbon monoxide, being ideal for direct passage to the decarbiding zone.

One preferred arrangement of apparatus suitable for carrying out the present invention is illustrated diagrammatically in the figure of the attached drawing. Therein a lower reaction vessel 1 of cylindrical form contains a mass of iron catalyst particles of a depth indicated by the upper level 2. Means, comprising a heat exchanger 3, is provided for controlledly abstracting the exothermic heat of reaction. The heat exchanger 3 is only diagrammatically illustrated as comprising a plurality of vertically extending cooling tubes 4 joined by upper and lower headers 5 and 6, respectively. More advantageously, it is so configurated as to permit a high degree of contact of the gas phase with the catalyst particles in a state of dense phase fluidization, as will hereinafter appear, and is intended to be supplied with coolant at any suitable temperature, such that the cooling surfaces of the exchanger, and accordingly the mass of catalyst, may be accurately held at any predetermined temperature within narrow limits.

Obviously, from the foregoing, any equivalent type of exchanger may be used, as for example, a series of vertically extending tubes through which the catalyst passes, the tubes being enclosed by a jacket supplied with the coolant. As is known, moreover, the coolant may comprise water, Dowtherm, or any other suitable fluid, predetermined temperature conditions being maintained by suitable circulation or by pressure control of the evaporating liquid.

While not a necessity, the catalyst may be advantageously handled in accordance with the known technique of fluidization in a relatively finely powdered form, wherein the particles are suspended or buoyed up in the upflowing reactants. Thus with a catalyst of 200 mesh and finer, for example, and with a suitable up-flow of gas, the particles maintain a relatively light, aerated, fluidized condition capable of being mechanically handled and of good heat transfer properties.

The bottom of the first stage reactor is provided with an outlet standpipe 7 controlled by a mechanical feeder 8 which discharges directly into the extremity of a screw feeder 9. The screw feeder 9 carries catalyst to a vertical elevator, represented only symbolically by the dotted line 10, which at its upper extremity discharges into screw feeder 11 which supplies a standpipe 12 for the upper or decarbiding zone. Flow through standpipe 12 is controlled by a second mechanical feeder such as the star feeder 13. Accordingly, catalyst from the carbiding zone may be conveyed, at any desired rate into the upper portion of a second or decarbiding vessel indicated by the reference numeral 14. This vessel, which may be constructed identically with the carbiding vessel 1, contains catalyst to the upper level 15, immersing a suitable cooling or heat exchanging unit 16 constructed in accordance with the previously mentioned principles.

A further standpipe 17 controlled by a star feeder 18 directs the catalyst from the decarbiding into the carbiding vessel. Accordingly, with this arrangement, and by controlled operation of the several feeding and conveying instrumentalities at a proper rate, catalyst may be caused to circulate continuously in a closed cycle between the two vessels while maintaining any desired levels therein.

During the aforementioned circulation, synthesis gas is introduced into the bottom of the lowermost reactor 1 from any suitable source, not shown, by way of inlet pipe 19, passing upwardly through the catalyst, while the carbon monoxide and hydrogen proceed to carbide the iron. The residual gas emanating from the upper surface 2 passes through a suitable filter or other separator 20 to remove any small amount of entrained solid particles and may be directly passed through outlet pipe 21 to a condenser 24 and separator 25, operating to condense out water vapor, which is removed as a water layer through pipe 26, the residual gases passing overhead through pipes 28 and 23 into the lower portion of the reactor 14, as indicated.

While it is preferred to operate the first stage or zone with little or no, and in any case only a minor proportion of, liquid hydrocarbon formation, any small amounts of such reaction products which do occur are readily removable as a hydrocarbon layer through pipe 29, and may be passed to any suitable instrumentality, not shown, for further treatment or recovery. Branch pipe 30, controlled by valve 31, leading from pipe 28, connects with the inlet pipe 19 and thus permits recycling of a portion of the product gases if desired.

In the upper or decarbiding vessel 14, the carbided catalyst is contacted with residual gas passing upwardly in countercurrent relationship thereto, the effluent gases, including hydrocarbons, being conducted by way of a filter or other suitable separating means 33 through outlet pipe 34. Preferably, and particularly in order to maintain a good state of catalyst fluidization in the decarbiding zone, where such a technique is employed, provision is made for recycling the stream passing through that zone to any desired extent. Such means comprises a recycle line 41 and a recycling pump 42 adapted to direct the recycle stream from outlet line 34 to inlet line 23. The unrecycled portion of the flow in outlet pipe 34 is supplied to a condenser 36 and a separator 37. While formation of water vapor in this stage is usually small, that which may occur can be periodically removed from the separator through pipe 38. The hydrocarbon layer, on the other hand, is removed by way of pipe 40 for passage, for example, to a suitable fractionation or stabilization system.

The normally gaseous fraction from separator 37 which may contain minor amounts of unconverted CO, $H_2$ and $CO_2$ together with residual inert gases and the like, may be vented through pipe 45 or may be recycled to any desired extent through the pipe 46 to the initial or carbiding stage in admixture with the incoming feed gases.

Where it is desirable to first recover the gaseous olefins, for alkylation, polymerization and the like, I prefer to supply the contents of pipe 45 to a suitable gas plant indicated diagrammatically by the reference numeral 47. This system operates with valved inlet pipe 48 and a valved outlet pipe 49 rejoining the recycle conduit 46 and supplying thereto, the residual product. The separated gases are conveyed off through the outlet pipe 50 for utilization as indicated above.

For example, the gas plant may operate to supply through outlet 49 a substantially pure stream of carbon dioxide as is hereinafter described. Since residual hydrogen and/or carbon monoxide are not usually objectionable for this purpose, they may also be included. Any conventional gas recovery systems may be used for this purpose. Valve 51 in pipe 45 permits the gaseous overhead from the separator to by-pass the recovery system or not, as desired. Branch pipe 52 with valve 53 permits venting excess carbon dioxide.

While it has been disclosed above that recycle via pipe 41 and pump 42 may be advisable to promote fluidization of catalyst, recycle of the separated normally gaseous fractions via valved transfer line 55 is more advantageous in that it eliminates recontact between the catalyst and the higher hydrocarbon products and results in net suppression of light hydrocarbon gas formation. Transfer line 55 as shown, connects pipe 46 above valve 51 with the inlet line 23 to the reactor 14.

In operation of the foregoing embodiment, catalyst is continuously circulated in the manner hereinbefore mentioned, and synthesis feed gas is introduced through pipe 19 into the lower vessel 1. The reactant feed is supplied at a rate, with respect to the catalyst passing through the vessel 1, such that the carbon monoxide introduced in the feed is consumed in the formation of iron carbide and water to the maximum degree economically feasible. The operating temperature selected is below the point at which any substantial proportion of hydrocarbons are formed, and in a range where elemental carbon formation is negligible. The residual gases pass to the reactor 14, through the condenser 24 and separator 25 where liquids are separated as described.

Accordingly the gases are supplied through pipe 23 to the lower portion of the decarbiding vessel 14. Herein these gases pass upwardly at a higher temperature, countercurrent to the highly carbided catalyst and since they comprise essentially hydrogen, and in some cases, carbon dioxide with usually an insignificant minor proportion of carbon monoxide, hydrocarbons are formed, desorbed and pass upwardly with residual gases through separating means 33 and outlet pipe 34. The condenser 36 and separator 37 remove normally liquid products and the gaseous products, preferably consisting largely or entirely of carbon dioxide, may be recovered or recycled as above.

In the carbiding zone the optimum temperature of operation with a typical iron catalyst is about 350° F. At materially lower temperatures, the reaction is less rapid and efficient, and with a decrease in temperature gradually slows up until a point of insufficient reaction occurs at below about 335° F. With an increase in temperature, however, the formation of hydrocarbons and other undesired reactions tends to increase until, at about 400° F. in a case of iron catalysts with which I am familiar, these become objectionable. Therefore, it is preferred to operate at below 400° F., and preferably below 370° F., temperatures being maintained by suitable control of the cooling means 3, as previously mentioned.

As indicated above, it is important that the carbiding step be so operated as to result in substantially complete consumption of the carbon monoxide. By this I mean at least 90 to 95% utilization of the carbon monoxide in the carbiding stage and preferably as high as 98% or greater. In fact with good contacting in the first stage the carbon monoxide content may be reduced to an insignificant value, which for commercial operations may be considered negligible.

With a good consumption of carbon monoxide in the region of 98% or higher, the process may be operated most advantageously with a minimum of gases other than hydrogen and carbon monoxide. On the other hand, with lower conversions in the carbiding zone and a relatively greater proportion of carbon monoxide supplied to the decarbiding zone, a substantial proportion of carbon dioxide, preferably not more than about 10% by volume, for example, on the basis of the fresh feed reactants, is effective in prolonging catalyst life.

The decarbiding zone 14 operates at a temperature, advantageously within the range of optimum temperatures which would prevail in the conventional synthesis reactor. Thus for example, with iron catalyst and pressures of about 225 pounds per square inch, the temperature of about 625° F. is usually preferred where gasoline is intended as the primary product. Where, however, a predominantly gaseous hydrocarbon product, as for example ethylene, is required, the temperature should be around 725° F. On the other hand, when operating essentially for waxy hydrocarbons, the characteristic optimum temperature would be in the range 475° F. Obviously, as is known, intermediate temperatures are advantageous for the production of hydrocarbons of characteristic intermediate molecular size.

It is to be understood that the invention is not limited to operation with the fluidized system above described for purposes of exemplification. On the contrary, the invention may be carried out with fixed or moving bed catalyst systems of any type involving separate carbiding and decarbiding zones. For example, the catalyst in a nonfluidized condition may be permitted to gravitate from one zone to another. Moreover, where fluidization is employed, the aforementioned system of conveyors and feeders may be advantageously substituted by a conventional fluidized gravity system employing a gas lift for elevating the catalyst or a circulatory system wherein movement of the catalyst is maintained by differential degrees of aeration in respective proportions of the cycle.

One important method of contact is that disclosed and claimed in my copending application, Serial No. 652,834, filed March 7, 1946, wherein quite finely divided catalyst is associated with substantially larger particles of a relative size appropriate to effect uniform fluidization. There, the advantages of a relatively finely powdered catalyst are secured without the formation of gas bubbles or slugs of catalyst which would otherwise tend to occur, the catalyst being preferably reconveyed continuously to the lower portion of the reactor in order to maintain a uniform admixture with the coarser particles. With fine catalysts of this character, the present invention may be carried out with the good contact hereinbefore referred to by which the carbon monoxide can be consumed to a negligent value in the carbiding stage.

A suitable catalyst cooling means, such for example as an intermediate cooling chamber, not shown, may in some instances be desirably interposed in standpipe 17 so that the relatively hot catalyst from the decarbiding zone will reach the carbiding zone at the lower temperature required. This is a significant factor in the case of non-fluidized operations. It is not usually necessary however, with the previously described embodiment wherein the fluidized mass of particles in the lower or carbiding zone effects a substantially instantaneous reduction in temperature of the relatively small stream of incoming catalyst. In other words, with fluidization of the catalyst in the presence of adequate cooling surfaces, the respective catalyst treatment zones may be maintained at proper respective temperatures throughout, in most instances obviating the necessity for intermediate separate cooling of the catalyst.

In accordance with one specific example illustrating the present invention, a system analogous to that shown in the figure of the drawing is operated with the catalyst circulating cyclically between carbiding and decarbiding zone. The catalyst consists of iron, containing about 1% of potassium oxide ($K_2O$) and about 2% alumina ($Al_2O_3$), of 200 mesh and finer, at least 65% passing a 325 mesh screen.

In the carbiding zone, catalyst is supplied with an upwardly flowing fresh feed of synthesis gas having the following composition:

| | Mol proportion |
|---|---|
| $H_2$ | 2.5 |
| CO | 1.2 |
| $CO_2$ | Trace |
| $CH_4$ | Trace |
| $H_2O$ | Trace |

The feed gas is passed, through the reaction zone at a rate at which the catalyst is held in a state of good dense phase fluidization. The rate of catalyst circulation is meanwhile adjusted until a condition of substantially complete utilization of carbon monoxide occurs in the reactor at a temperature of 350° F. and a pressure of 200 pounds per square inch gauge. More specifically, the fixed gases collected from the top surface of the fluidized mass of catalyst after condensation and separation at about 100° F. are essentially hydrogen.

This effluent is passed into the lower portion of the decarbiding zone through a mass of catalyst previously withdrawn from the carbiding zone. The gases pass upwardly through the mass of powdered catalyst and are withdrawn after contact, and recycled to the lower portion of the decarbiding zone in the recycle ratio of 5:1, to maintain a good state of fluidization, with a total contact time of 20 seconds at a temperature of 620° F. ±5. This zone is also operated under pressure of 200 pounds per square inch gauge.

The remaining portion of the gaseous effluent from the decarbiding zone not recycled is subjected to condensation and separation at 70° F. resulting in a liquid layer of hydrocarbons boiling predominantly within the motor gasoline range. The normally gaseous product from the separator is essentially gaseous hydrocarbons in an amount less than five percent based on the carbon monoxide entering the system. Associated therewith is a negligible proportion of carbon dioxide. Negligible quantities of hydrocarbons are recovered from the gaseous effluent of the first or carbiding stage.

In the above example, the production of $C_2$ and heavier hydrocarbons amounts to about 95% of the theoretical based upon the carbon monoxide consumed, and is predominantly in the motor gasoline boiling range.

In a similar example wherein the inlet feed to the carbiding zone is composed of the following mol proportion of ingredients:

| | Mol proportion |
|---|---|
| $H_2$ | 3.6 |
| $CO$ | 1.2 |
| $CO_2$ | 0.4 |
| $CH_4$ | Trace |
| $H_2O$ | Trace | conditions are otherwise maintained identically the same except that steam is introduced into the feed to the decarbiding zone in an amount approximating the molar quantity of carbon dioxide present. This is equal, in turn, to the carbon dioxide supplied. The yield of liquid hydrocarbons from the decarbiding stage amounts to about 94% of the theoretical on the basis of the carbon monoxide and carbon dioxide supplied to the system and consumed.

A further particular advantage of the present invention resides in the fact that some control of the character of the hydrocarbons produced may be effected by control of the ratio of hydrogen to carbon monoxide and carbon dioxide in the feed gases. Thus it is possible in a continuously operating system as above with a substantial excess of catalyst so that carbiding proceeds readily and continuously, recycling the catalyst through the several zones while using a unitary fresh feed gas successively passed through the two zones, to influence definitely the course of the reaction by a selective tendency toward the production of hydrocarbons having a lower hydrogen content than saturated paraffin, namely, unsaturated hydrocarbons and, to some extent, aromatics. That is to say, the present invention has the advantage of enabling the production of greater proportion of desired unsaturated and aromatic hydrocarbons than heretofore attained in hydrocarbon synthesis. This effect is produced by limiting the hydrogen in the feed gas below that normally employed and necessary to produce saturated hydrocarbons.

For example, when the hydrogen and carbon monoxide in the feed gas to the carbiding reactor are present in a lower relative molar ratio than about 2:1, but substantially above a 1:1 ratio, and preferably above a ratio of 1.5:1, and where carbon monoxide is substantially completely consumed in the first stage the production tends appreciably to shift toward the type of hydrocarbons corresponding to the ratio in which the hydrogen and carbon are supplied.

In a yet further example carried out identically as the first example hereinabove, but wherein the molar proportion of hydrogen to carbon monoxide is reduced to 1.5:1 a substantially increased proportion of unsaturates and hydrocarbons appears in the final product.

Where however any substantial proportion of carbon dioxide is supplied to the system, it is advisable that the total molar proportion of hydrogen supplied to the system be adjusted to allow for the presence of the carbon dioxide. Thus normally the feed gas should contain hydrogen in an amount, twice the molar proportion of carbon monoxide plus three times the molar proportion of carbon dioxide supplied.

On the other hand, the tendency toward the production of unsaturated compounds may be employed by restricting the proportion of hydrogen in the feed gas below that indicated by the foregoing relationship. Stated in a general way therefore, when operating in accordance with the present invention, the atomic ratio between the hydrogen and carbon in the fresh feed should be substantially greater than 2:1.

While mention has been made specifically of the synthesis of hydrocarbon products of reaction, nevertheless, the invention applies generally to conversion of carbon monoxide and hydrogen into the usual desired synthetic organic compounds including oxygen containing compounds and the like.

While the foregoing description largely exemplifies the invention on the basis of an iron catalyst, it is to be understood that other conventional catalysts, for the catalytic reduction of carbon oxides with hydrogen, namely metals of the iron group, such as cobalt, nickel and ruthenium may be substituted. Operation is advantageously carried out as in the above example with the exception, however, that the temperature as well as pressure conditions prevailing in the decarbiding zone will, in each case, be those characteristic of the conventional optimum synthesis temperature for that catalyst.

The catalyst may vary widely in composition and physical structure. Advantageously it may comprise metallic particles as above, although other conventional synthesis catalysts may, in general, be substituted. Where fluidization is desired, the catalyst is preferably in the form of a fine powder capable of being aerated to a condition analogous to that of a boiling liquid, by the reactant gases. For this purpose, particle sizes are usually finer than 40 mesh, preferably 200 mesh. In the absence of fluidization, particle size may usually be varied without limit. Any conventional promoters and activators may be included.

Obviously many modifications and variations of the invention, as hereinbefore set forth, may be made without departing from the spirit and scope thereof, and therefore only such limitations should be imposed as are indicated in the appended claims.

I claim:

1. In the process of synthesizing hydrocarbons, the steps including first carbiding iron by reacting the iron with synthesis gas comprising a mixture of hydrogen and carbon monoxide, with the hydrogen in substantial molar excess, in a carbiding zone at an elevated temperature below the range at which any substantial formation of hydrocarbons occurs and below about 370° F. at which hydrogen and carbon monoxide react with iron in approximately equal molar proportions to carbide said metal with the formation of water as the essential by-product of the reaction, continuing said reaction to effect substantially complete consumption of the carbon monoxide contained in the synthesis gas mixture supplied to said carbiding zone, thereby forming a normally gaseous product comprising hydrogen substantially free of carbon monoxide, withdrawing the said effluent gaseous product fraction from the carbiding zone, and thereafter reacting said gaseous product with the iron carbide thus formed, in a decarbiding zone at a temperature at which liquid hydrocarbons are formed.

2. The method according to claim 1, wherein said elevated temperature is in the range of about 335–370° F.

3. The method according to claim 1, wherein at least about 98 per cent of the carbon monoxide supplied to the carbiding zone is consumed therein.

4. The method according to claim 1, wherein the synthesis gas mixture contains at least about two mols of hydrogen per mol of carbon monoxide.

5. The method according to claim 1, wherein said synthesis gas mixture contains carbon dioxide in a substantial proportion not greater than 10 per cent by volume on the basis of the hydrogen and carbon monoxide present.

6. The method according to claim 1, wherein the molar proportion of hydrogen in the synthesis gas mixture approximates the sum of twice the molar proportion of carbon monoxide and three times the molar proportion of carbon dioxide.

7. The method according to claim 1, wherein the synthesis gas mixture comprises a minor proportion of carbon dioxide and wherein the molar content of hydrogen in the mixture at least approximates the sum of twice the molar content of carbon monoxide and three times the molar content of carbon dioxide.

CLAUDE W. WATSON.

REFERENCES CITED

The following references are of record in the file of this patent:

UNITED STATES PATENTS

| Number | Name | Date |
| --- | --- | --- |
| 2,369,548 | Elian | Feb. 13, 1945 |
| 2,409,235 | Atwell | Oct. 15, 1946 |
| 2,445,796 | Millendorf | July 27, 1948 |

OTHER REFERENCES

Fischer-Lessing, Conversion of Coal into Oil, pages 258–262 (1925).